(12) United States Patent
Ono

(10) Patent No.: US 7,295,501 B2
(45) Date of Patent: Nov. 13, 2007

(54) APPARATUS AND METHOD FOR CONTROLLING A FOCUS JUMP AND LEVEL THEREOF IN A MULTILAYER OPTICAL DISK

(75) Inventor: Takayuki Ono, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 599 days.

(21) Appl. No.: 10/625,005

(22) Filed: Jul. 23, 2003

(65) Prior Publication Data

US 2004/0125708 A1 Jul. 1, 2004

(30) Foreign Application Priority Data

Jul. 30, 2002 (JP) ............................ 2002-221455

(51) Int. Cl.
*G11B 7/00* (2006.01)
(52) U.S. Cl. ................................ 369/53.23; 369/44.25
(58) Field of Classification Search ............ 369/53.37, 369/44.27, 53.23, 44.25
See application file for complete search history.

(56) References Cited

U.S. PATENT DOCUMENTS

| 5,831,953 | A | * | 11/1998 | Numata | .................. | 369/53.23 |
| 6,061,310 | A | * | 5/2000 | Iida | .................... | 369/44.27 |
| 6,208,597 | B1 | * | 3/2001 | Yoshimi | ................ | 369/44.29 |

FOREIGN PATENT DOCUMENTS

| JP | 11-039665 | 2/1999 |
| JP | 11-203685 | 7/1999 |
| JP | 11-353657 | 12/1999 |
| JP | 2000-298846 | 10/2000 |
| JP | 2000-353324 | 12/2000 |
| JP | 2001-331950 | 11/2001 |

OTHER PUBLICATIONS

Japanese Office Action dated Sep. 2, 2004 with English translation (7 pages).
Patent Abstracts of Japan, Publication No. 11-039665 dated Feb. 2, 1999, 1 pg.

(Continued)

*Primary Examiner*—Gautam R. Patel
(74) *Attorney, Agent, or Firm*—Osha Liang LLP

(57) ABSTRACT

A focus control is performed on the basis of a focus error signal indicative of a deviation amount from a focus state in a recording layer of a laser beam emitted for reproducing information to an optical disk having a plurality of recording layers. Specifically, at the time of focus-jumping a laser beam from a recording layer to another recording layer, an acceleration pulse or a deceleration pulse as a brake signal for making a focus jump is applied to a focus drive signal for controlling driving of an optical pickup for emitting a laser beam. The timing of applying each of the brake signals is variably set on the basis of the level of a focus error signal of a recording layer as an object of the focus jump. As a result, the focus jump can be accurately made in accordance with variations in the level of the focus error signal caused by variations in transmittance of light according to materials of the recording layers.

7 Claims, 8 Drawing Sheets

OTHER PUBLICATIONS

Patent Abstracts of Japan, Publication No. 2001-331950 dated Nov. 30, 2001, 1 pg.

Patent Abstracts of Japan, Publication No. 2000-353324, Publication Date Dec. 19, 2000, 1 page.

Patent Abstracts of Japan, Publication No. 2000-298846, Publication Date Oct. 24, 2000, 1 page.

Patent Abstracts of Japan, Publication No. 11-353657, Publication Date Dec. 24, 1999, 1 page.

Patent Abstracts of Japan, Publication No. 11-203685, Publication Date Jul. 30, 1999, 1 page.

* cited by examiner

TB1

| FL1 | LV:SPECIFICATION LEVEL |
|---|---|
| 1 | × × × |
| 0 | △△△ |

TB2

| RECORDING LAYER INFORMATION | FL2 |
|---|---|
| RECORDING LAYER 102 | "1"("0") |
| RECORDING LAYER 104 | "0"("1") |
| ⋮ | ⋮ |

APPARATUS AND METHOD FOR CONTROLLING A FOCUS JUMP AND LEVEL THEREOF IN A MULTILAYER OPTICAL DISK

BACKGROUND OF THE INVENTION

1. Field of the Invention

The present invention relates to an apparatus and a method for controlling focus of laser beam in an optical disk and, more particularly, to an optical disk drive, a focus control apparatus, and a focus control method having the function of controlling a focus jump operation performed on a multilayer optical disk.

2. Description of Background Art

Conventionally, as optical disks driven by an optical disk drive (reproducing or writing apparatus), a CD (Compact Disk) and a DVD (Digital Versatile Disk) are used. The DVD has a multilayer structure having two or more recording layers for recording a large amount of information.

FIG. 6 shows an example of the structure of a DVD having two recording layers. A DVD 100 of FIG. 6 has a structure that a disk in which a recording layer 102 is formed on a substrate 101 and a disk in which a recording layer 104 is formed on a substrate 103 are adhered to each other via a space layer 105. Substrates 101 and 103 are made of a transparent material such as a polycarbonate resin. Space layer 105 is made of a resin material for bonding the substrates, and the resin material has a light transmitting property.

In a disk drive for DVD 100, a laser beam is emitted from an optical pickup 1 which will be described later onto tracks on recording layer 102 or 104 of DVD 100 rotated by a not-shown spindle motor and reflection light is detected, thereby reading (reproducing) data.

To perform reproducing operation by using a laser beam, the spot of a laser beam has to be maintained in a focus state on recording layer 102 or 104. Consequently, a focus servo mechanism for controlling a focus state by moving a not-shown objective lens as an output end of the laser beam so as to be close/apart to/from DVD 100 is mounted.

The focus servo mechanism usually includes a two-function driver constructed by a focus driver for moving the objective lens so as to close/apart to/from DVD 100 and a tracking driver, and a focus servo circuit system. The focus servo circuit system generates a focus error signal FE from reflection light information from DVD 100, operates a focus drive signal FD on the basis of focus error signal FE, and applies focus drive signal FD to a not-shown focus coil of the two-function driver. That is, the focus servo mechanism is constructed as a feedback control system.

Referring to FIG. 7, a timing of turning on the focus servo system on the basis of focus error signal FE will be described. Focus error signal FE is a signal indicative of a deviation amount from a focus state on a recording face of the beam spot of a laser beam. FIG. 7 schematically shows a focus state by optical pickup 1 on recording layers 102 and 104 of FIG. 6 and the waveform of focus error signal FE with lapse of time T.

As already well known, the range in which a laser beam can be led to a focus state on the basis of focus error signal FE is a very narrow range in which an S curve is observed as focus error signal FE. Consequently, to execute focus serve excellently, timings to turn on a focus servo loop are important. The timing of turning on the focus servo is as follows. When focus error signal FE is observed and the position of the objective lens is in a range, the S curve of focus error signal FE is observed. At timings T1 and T2 in FIG. 7 corresponding to timings when the S curve becomes linear (or zero cross timings), the focus servo loop is turned on. FIG. 7 shows that at timing T1, a focus state is obtained in recording layer 104, after that, an operation of jumping a laser beam to recording layer 102 is performed and, at the next timing T2, a focus state is achieved in recording layer 102.

To move the focal point of a laser beam from a state were a laser beam from optical pickup 1 is focused in recording layer 102 (or recording layer 104) to recording layer 104 (or recording layer 102) during reproduction will be called a focus jump. In the case of making such a focus jump, a pulse signal constructed by an acceleration signal or a deceleration signal is applied to the focus servo loop to make a laser beam from optical pickup 1 make a jump to a new recording layer. After that, a focus servo is applied so as to lower the level of focus error signal FE on the face of the new recording layer.

The flowchart of FIG. 8 shows a control procedure of a conventional focus jumping operation. FIGS. 9 and 10 show examples of waveforms of focus error signal FE and focus drive signal FD detected during the focus jumping operation of FIG. 8 together with lapse of time T. A conventional focus jumping operation will be described with reference to FIGS. 8 to 10.

First, during a scan of tracks in a recording layer in DVD 100 with optical pickup 1, when an instruction of a focus jump to another recording layer is detected on the basis of a signal read by the scan, on the basis of the detected jump instruction, a focus jumping operation starts. It is assumed here that a jump to recording layer 102 is instructed during scan of tracks in recording layer 104 in FIG. 7.

In a period in which a laser beam from optical pickup 1 is in a focus state in recording layer 104 (first layer) (period T10 in FIG. 9), focus error signal FE maintains a focus level. When the focus jump instruction is detected at timing P1 in FIG. 9, the focus jump is started (step (hereinbelow, referred to as S) 31).

First, an acceleration pulse PL1 is applied to focus drive signal FD (S32), so that optical pickup 1 starts moving to make the laser beam jump to recording layer 102 (second layer) by a focus servo. At this time, in parallel with the movement, focus error signal FE is detected and whether or not the level of detected focus error signal FE has reached a predetermined acceleration complete level ACL shown in FIG. 9, that is, whether or not the level of focus error signal FE has reached the level indicative of completion of movement to recording layer 102 of the laser beam from optical pickup 1 (S33) is determined (S33).

When it is determined that the level of focus error signal FE has reached acceleration complete level ACL, at timing P2 in FIG. 9, focus drive signal FD is held at 0 to finish acceleration (S34). In period T20 in FIG. 9 after completion of acceleration, the laser beam from optical pickup 1 continues moving due to inertia. In period T20, the laser beam is in a focus in a semitransparent layer, so that light is not reflected and focus error signal FE is not detected.

After that, whether focus error signal FE has reached a predetermined deceleration commence level DCL or not is determined (S35). If it is determined that focus error signal FE has not reached the level (NO in S35), whether predetermined deceleration commence time-out period TT has elapsed after completion of acceleration or not is determined (S36). If the deceleration commence time-out period TT has not elapsed yet (NO in S36), the program returns to S35 and the process is repeated.

On the other hand, when it is determined that deceleration commence time-out period TT has elapsed (YES in S36), a deceleration pulse PL2 is outputted for predetermined time to focus drive signal FD and the focus servo system is stopped (S37 and S38). By the operation, the focus jump of the laser beam of optical pickup 1 to recording layer 102 is completed, focus error signal FE reaches a focus level, and the laser beam of optical pickup 1 is in a focus in recording layer 102.

According to FIGS. 8 and 9, the focus servo is controlled so as to lead a laser beam to a focus state on the basis of focus error signal FE. However, since focus error signal FE includes an error caused by variations in intervals in a plurality of recording layers and variations in transmittance of light according to materials of layers constructing DVD 100, it is difficult to stably always make an accurate focus jump so as to bring light into a focus on a target recording face.

Consequently, in the conventional focus jump control operation, as shown in FIG. 10, in the case where the level of focus error signal FE of the recording layer as a destination of the focus jump is too low and cannot reach deceleration commence level DCL, deceleration pulse PL2 cannot be applied in deceleration commence time-out period TT. Due to this, deceleration pulse PL2 is applied when the laser beam is positioned in a region which is not the recording layer as a jump destination, so that the focus jump cannot be accurately made.

Techniques regarding focus jump control other than the above-described focus jump operation are disclosed in Japanese Patent laying-Open Nos. 11-203685, 11-353657, 2000-298846, and 2000-353324.

Japanese Patent laying-Open No. 11-203685 teaches a procedure of making a safe jump by applying a brake before a focal point in a focus jump operation. In the publication, in a disk in which many axial runouts occur, to avoid erroneous operation of a focus jump caused by variations in relative speeds of the disk and a beam spot (lens), a brake is applied by using a differential signal of the focus error signal and a servo is turned on at the next zero-cross point of the focus error signal.

Japanese Patent laying-Open No. 11-353657 discloses a procedure of switching a braking operation according to lapse time from start of a control to a zero-cross point of focus error signal FE.

In Japanese Patent laying-Open No. 2000-353324, movement time of an optical beam from a present position to a position in a destination of a focus jump is measured and, on the basis of the measured movement time, the waveform of a deceleration pulse applied to focus drive signal FD is changed.

However, the conventional techniques do not show a procedure for applying an acceleration pulse and a deceleration pulse for a focus jump while monitoring the level of focus error signal FE. Therefore, an error of focus error signal FE caused by variations in intervals in a plurality of recording layers and variations in transmittance of light according to materials of layers constructing a disk cannot be absorbed and a focus jump cannot be made accurately.

Japanese Patent laying-Open No. 2000-298846 teaches a procedure for stably making a focus jump irrespective of variations in the structure of a focus actuator and variations in intervals of a plurality of-recording layers by making the threshold level of focus error signal FE different values in five points. Concretely, by making a threshold at the start of braking operation and a threshold of stop of braking operation different values, detection of the threshold of start of braking operation is facilitated. However, the thresholds are fixed, so that they cannot follow fluctuations in threshold level of focus error signal FE caused by variations in the material of a disk. Consequently, an error of focus error signal FE caused by variations in transmittance of light according to materials of layers constructing a disk cannot be absorbed and a focus jump cannot be made accurately.

SUMMARY OF THE INVENTION

An object of the present invention is to provide an optical disk drive, a focus control apparatus and a focus control method capable of making an accurate focus jump.

In order to achieve the object, a focus control apparatus according to an aspect of the present invention controls focus of a laser beam emitted to reproduce information onto an optical disk in which a plurality of recording layers are formed on the basis of a focus error signal indicative of a deviation amount of the laser beam from a focus state in any of the recording layers. Concretely, the focus control apparatus includes a jump signal applying part and a timing setting part. At the time of making the laser beam emitted focus jump from a recording layer to another recording layer, the jump signal applying part applies a brake signal for making a focus jump to a drive signal for controlling driving of a light emitting part which is preliminarily provided to emit the laser beam. The timing setting part variably sets a timing of applying the brake signal by the jump signal applying part on the basis of level of the focus error signal of the recording layer as an object of the focus jump.

Therefore, the timing of applying a brake signal for making a focus jump is variably set on the basis of the level of a focus error signal of a recording layer as an object of the focus jump.

Since the focus jump can be made on the basis of the level of the focus error signal indicative of a deviation amount from the focus state in a recording layer of a laser beam, in other words, in accordance with variations in the level of the focus error signal caused by variations in transmittance of light according to materials of the recording layers constructing an optical disk and the like, the accurate focus jump is realized.

Preferably, the timing setting part includes a level determining part and a level varying part. The level determining part determines whether the level of the focus error signal of the recording layer as an object of a focus jump reaches level specifying the timing of the focus jump or not. The level varying part lowers the specification level in accordance with determination made by the level determining part that the level of the focus error signal does not reach the specification level. When it is determined by the level determining part that the level of the focus error signal reaches the specification level, the brake signal is applied by the jump signal applying part.

Therefore, when it is determined that the level of a focus error signal in a recording layer as an object of a focus jump does not reach the level specifying the timing of the focus jump, the specification level is changed to be lowered. Consequently, when a focus jump is made with respect to the recording layer after that, it is guaranteed that the level of the focus error signal of the recording layer reaches the specification level. Therefore, even if the level of the focus error signal varies according to a recording layer, an accurate focus jump can be made.

When it is determined by the level determining part that the level of the focus error signal reaches the specification level, a brake signal is promptly applied by the jump signal applying part. Thus, a focus jump in an accurate position can be made.

In the focus control apparatus, preferably, the brake signal includes an acceleration pulse signal for starting acceleration regarding the focus jump and a deceleration pulse signal for starting deceleration to be applied within a specific time-out period after application of the acceleration pulse signal. The level determining part determines whether the level of the focus error signal reaches the specification level within the specific time-out period or not.

Since an acceleration is started for a focus jump, another recording layer as a destination of the jump is irradiated with a laser beam, and a focus is achieved, in the specific time-out period as a period in which deceleration is to start, whether the level of the focus error signal reaches the specification level or not is determined. Therefore, whether the level of the focus error signal in another recording layer as a destination of a jump reaches the specification level or not, that is, whether a normal focus jump can be made or not can be determined within the specific time-out period.

Preferably, the specific time-output period is set on the basis of a period in which the another recording layer as a destination of the jump can be irradiated with the laser beam. Therefore, the specific time-out period is set on the basis of the period in which another recording layer can be irradiated with the laser beam without deviating from the recording layer as a destination of the jump while the light emitting part is driven. Thus, whether a normal focus jump can be made or not can be determined in the period in which a normal focus jump can be made.

The focus control apparatus is preferably provided for an optical disk drive, and the optical disk drive has the above-described light emitting part.

Therefore, in the case of making a focus jump in the optical disk drive, the above-described features can be obtained, and an accurate focus jump can be made.

In order to achieve the object, a focus control method according to another aspect of the present invention is a method of controlling focus of a laser beam emitted to reproduce information onto an optical disk in which a plurality of recording layers are formed on the basis of a focus error signal indicative of a deviation amount from a focus state in any of the recording layers of the laser beam. Concretely, the method includes a jump signal applying step and a timing setting step. In the jump signal applying step, at the time of allowing the laser beam emitted to make a focus jump from a recording layer to another recording layer, a brake signal for the focus jump is applied to a drive signal for controlling driving of a light emitting device which is preliminarily provided to emit the laser beam. In the timing setting step, a timing of applying the brake signal by the jump signal applying step is variably set on the basis of level of the focus error signal of the recording layer as an object of the focus jump.

Therefore, the timing of applying the brake signal for making a focus jump is variably set on the basis of the level of the focus error signal of a recording layer as an object of the focus jump.

Since the focus jump can be made on the basis of the level of the focus error signal indicative of a deviation amount from the focus state in a recording layer of a laser beam, in other words, in accordance with variations in the level of the focus error signal caused by variations in transmittance of light according to materials of the recording layers constructing an optical disk and the like, the accurate focus jump is realized.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

An embodiment of the present invention will be described hereinbelow with reference to the drawings. An optical disk drive having a focus jump control function may have only a reproduction system or may have both a reproduction system and a recording system.

Figure 1:
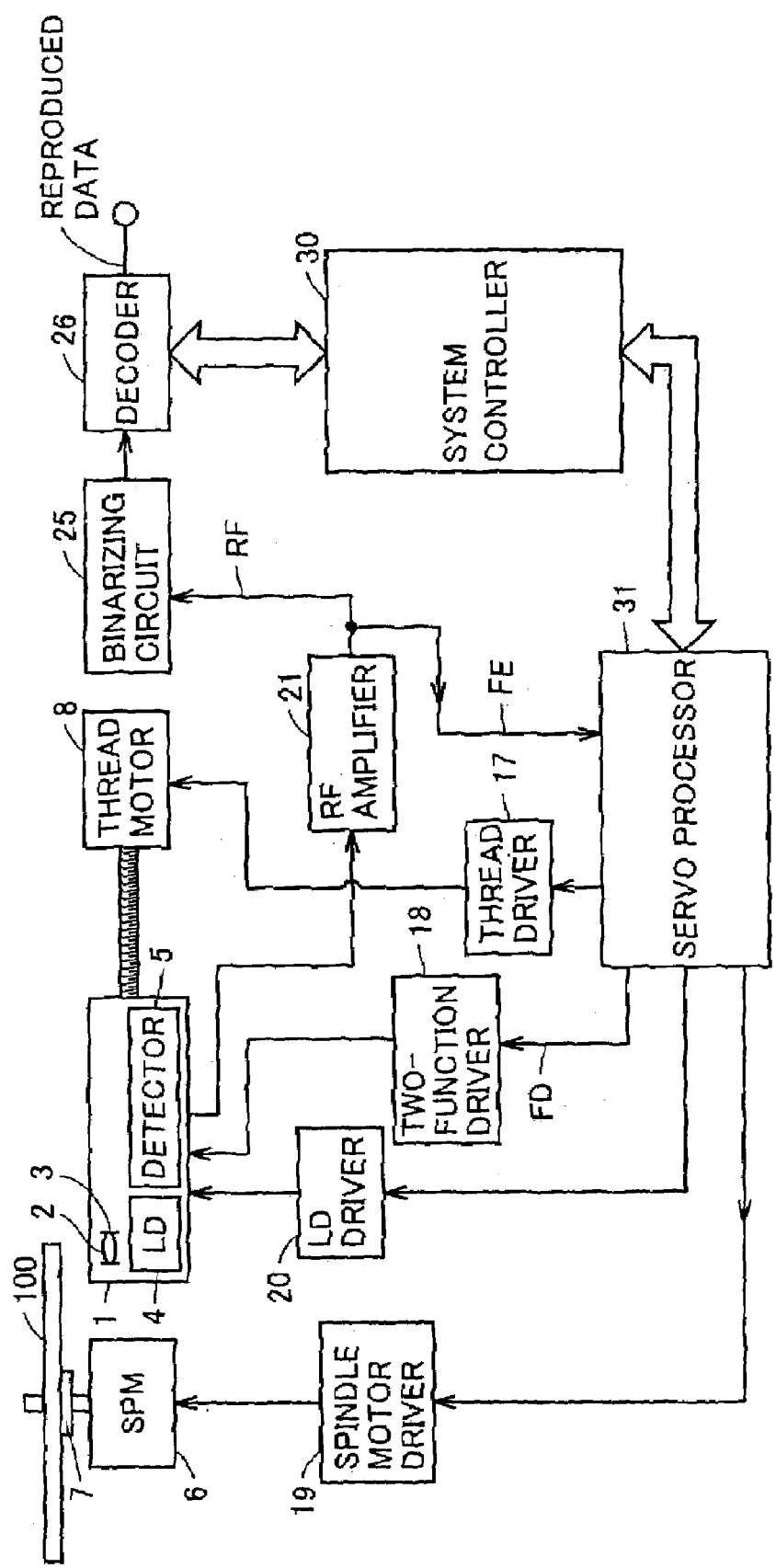
FIG. 1 is a diagram showing the configuration of an optical disk drive according to an embodiment.

FIG. 1 shows the configuration of an optical disk drive according to the embodiment. Referring to FIG. 1, the optical disk drive has a turn table 7 on which DVD 100 is mounted, a spindle motor 6 for rotating turn table 7, a spindle motor driver 19 for driving spindle motor 6, an optical pickup 1 for irradiating DVD 100 with a laser beam, an LD (Laser Diode) driver 20 for driving irradiation of the laser beam of optical pickup 1, a two-function driver 18 having a focus driver and a tracking driver for optical pickup 1, a thread motor 8, a thread driver 17 for controlling thread motor 8, an RF (Radio Frequency) amplifier 21 for amplifying an RF signal of a reproduction signal outputted from optical pickup 1, a binarizing circuit 25 for binarizing the RF signal outputted from RF amplifier 21, a decoder 26 for decoding the binarized signal and outputting reproducted data, a servo processor 31, and a system controller 30 for controlling servo processor 31 and decoder 26.

Optical pickup 1 has a lens 2, a two-function mechanism 3, an LD 4, and a detector 5.

Servo processor 31 controls thread driver 17, two-function driver 18, spindle motor driver 19, and LD driver 20.

In operation, when DVD 100 is placed on turn table 7 and reproducing operation is performed, a laser beam outputted from LD 4 of optical pickup 1 via LD driver 20 goes out from lens 2 and is emitted onto recording layer 102 or 104.

Reflection light of the laser beam is detected by detector 5 and converted to an electric signal. The electric signal is supplied to RF amplifier 21.

RF amplifier 21 generates a necessary signal on the basis of the given signal. For example, RF amplifier 21 generates an RF signal (shown as "RF" in FIG. 1) as reproduction data and focus error signal FE for servo control. Although RF amplifier 21 also generates a tracking error signal and the like, to simplify description, the other signals such as a tracking error signal generated will not be described here.

The RF signal outputted from RF amplifier 21 is supplied to binarizing circuit 25, and focus error signal FE is supplied to servo processor 31.

The RF signal is binarized by binarizing circuit 25 and resultant binary data is supplied to decoder 26. Decoder 26 performs a predetermined decoding process on the binary data and outputs read (reproduced) information from DVD 100.

Servo processor 31 generates focus drive signal FD in accordance with focus error signal FE from RF amplifier 21 and outputs focus drive signal FD to two-function driver 18. Two-function driver 18 receives focus drive signal FD and drives two-function mechanism 3 of optical pickup 1 in accordance with received focus drive signal FD. In such a manner, a tracking servo loop and a focus servo loop are formed by optical pickup 1, RF amplifier 21, servo processor 31, and two-function driver 18. For simpler description, the tracking servo loop will not be described here.

Servo processor 31 generates a thread drive signal on the basis of an access execution control signal or the like from system controller 30 and supplies it to thread driver 17. Thread driver 17 drives thread motor 8 in accordance with the supplied thread drive signal. As a result, optical pickup 1 is properly slid.

Emission of a laser beam of LD 4 of optical pickup 1 is driven by LD driver 20. Servo processor 31 generates a laser drive signal to execute laser beam emission of optical pickup 1 at the time of reproduction or the like in response to an instruction from system controller 30 and supplies the laser drive signal to LD driver 20 to control light emitting operation of LD 4.

Figures 2, 3A, 3B:
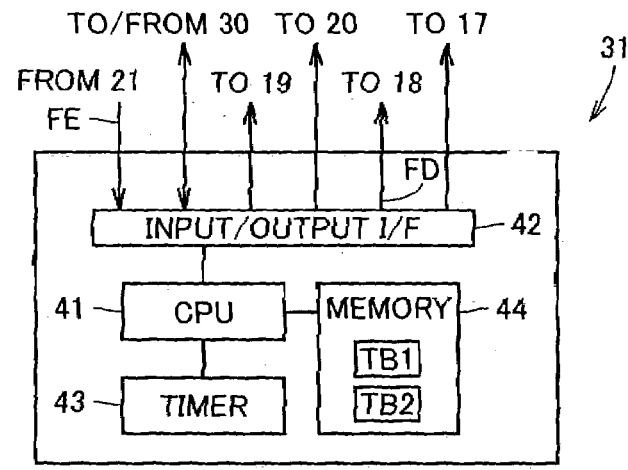
FIG. 2 is a diagram showing the configuration of a servo processor in FIG. 1.
FIGS. 3A and 3B are diagrams showing examples of the contents of tables.

FIG. 2 shows the configuration of servo processor 31 in FIG. 1. In FIG. 2, servo processor 31 includes a CPU (Central Processing Unit) 41, an input/output I/F (interface) 42, a timer 43, and a memory 44 for storing a processing program and various data. In this example, tables TB1 and TB2 in which data to be referred for controlling a focus jump is stored are pre-stored in memory 44. In table TB1, as shown in FIG. 3A, a specification level LV indicative of the level of focus error signal FE for starting deceleration at the time of a focus jump is registered in accordance with the value ("1" or "0") of a flag FL1. When flag FL1 shows "1", a focus jump from recording layer 102 to recording layer 104 is instructed. When flag FL1 shows "0", a focus jump from recording layer 104 to recording layer 102 is instructed.

In table TB2, as shown in FIG. 3B, recording layer information RLI specifying each of recording layers 102 and 104, and flag FL2 corresponding to each recording layer information RLI are registered. Flag FL2 indicates, when a recording layer indicated by corresponding recording layer information RLI is designated as a destination of a jump in a focus jump operation, whether the focus jump operation of last time has finished within deceleration commence time-out period TT or not. If the focus jump operation of last time finished after deceleration commence time-out period TT, "1" is set in flag FL2. If the focus jump operation of last time has finished within deceleration commence time-out period TT, "0" is set. Deceleration commence time-out period TT is determined on the basis of the period in which a laser beam from optical pickup 1 jumped in the focus jump operation can normally irradiate the recording layer without deviating from a recording layer as a destination of the jump.

Figure 4:
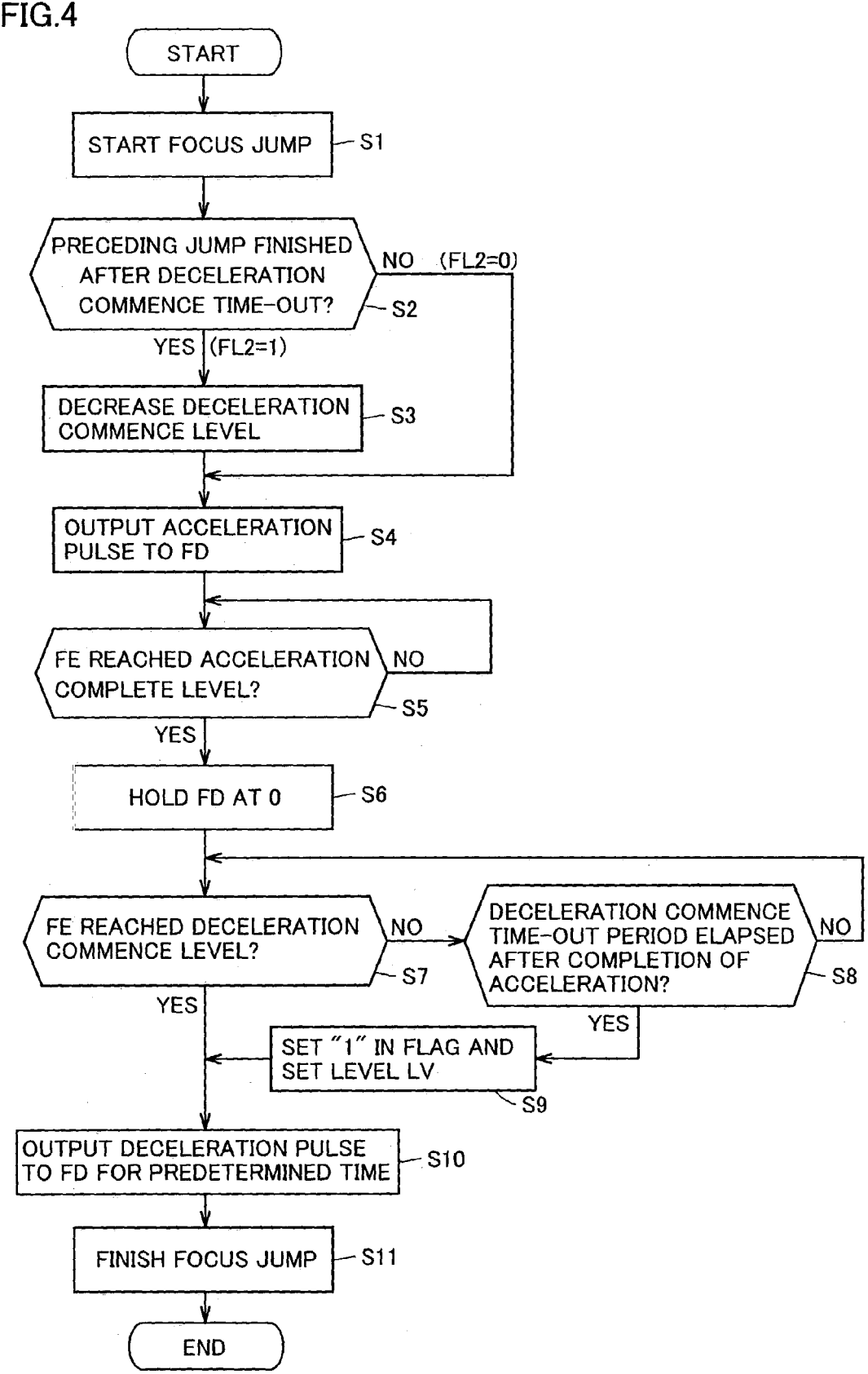
FIG. 4 is a flowchart showing a procedure of a focus jump operation according to the embodiment.
Figure 5:
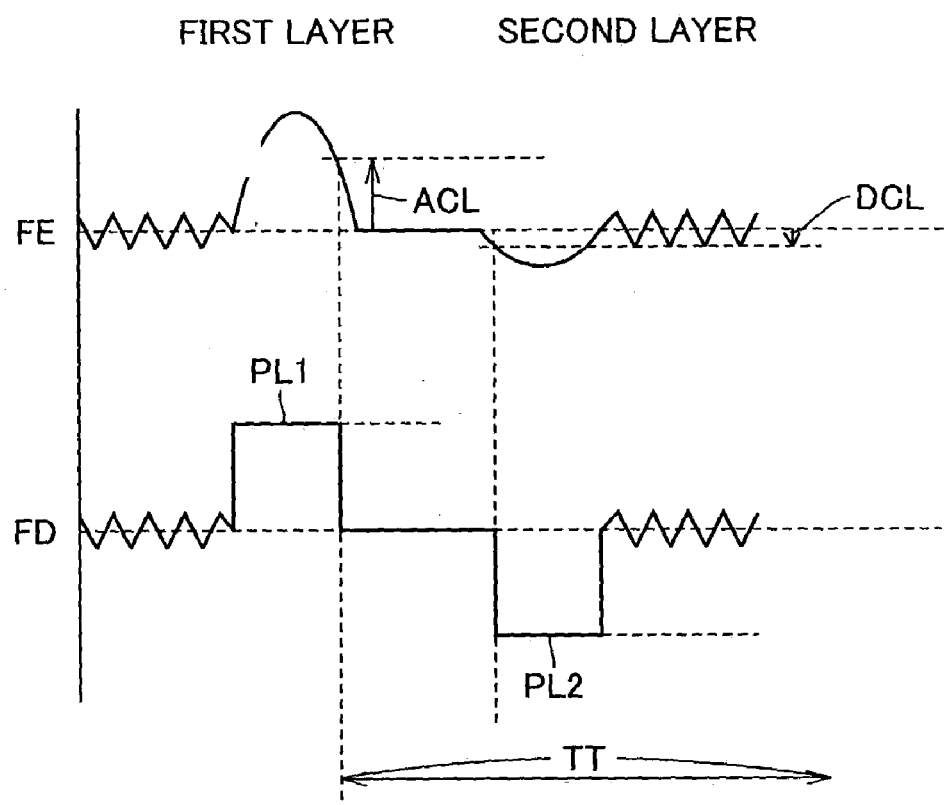
FIG. 5 is a diagram schematically showing the waveforms of a focus error signal and a focus drive signal according to the embodiment.
Figure 6:
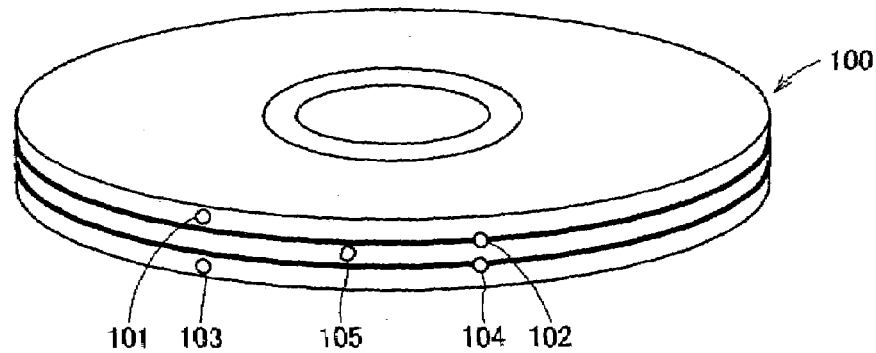
FIG. 6 is a diagram showing an example of the structure of a DVD including two recording layers.
Figure 7:
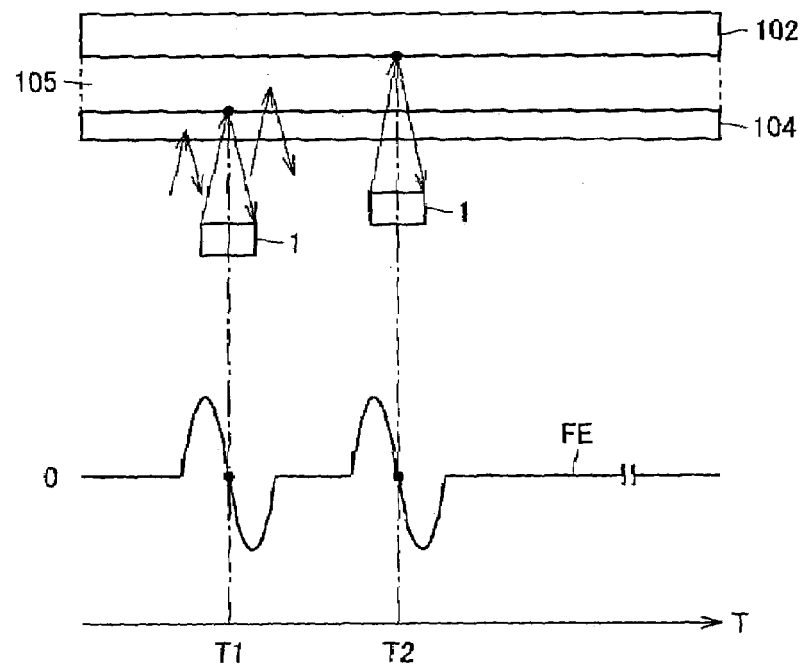
FIG. 7 is a diagram schematically showing a focus state in the recording layers in FIG. 6 and the waveform of the focus error signal with lapse of time.
Figure 8:
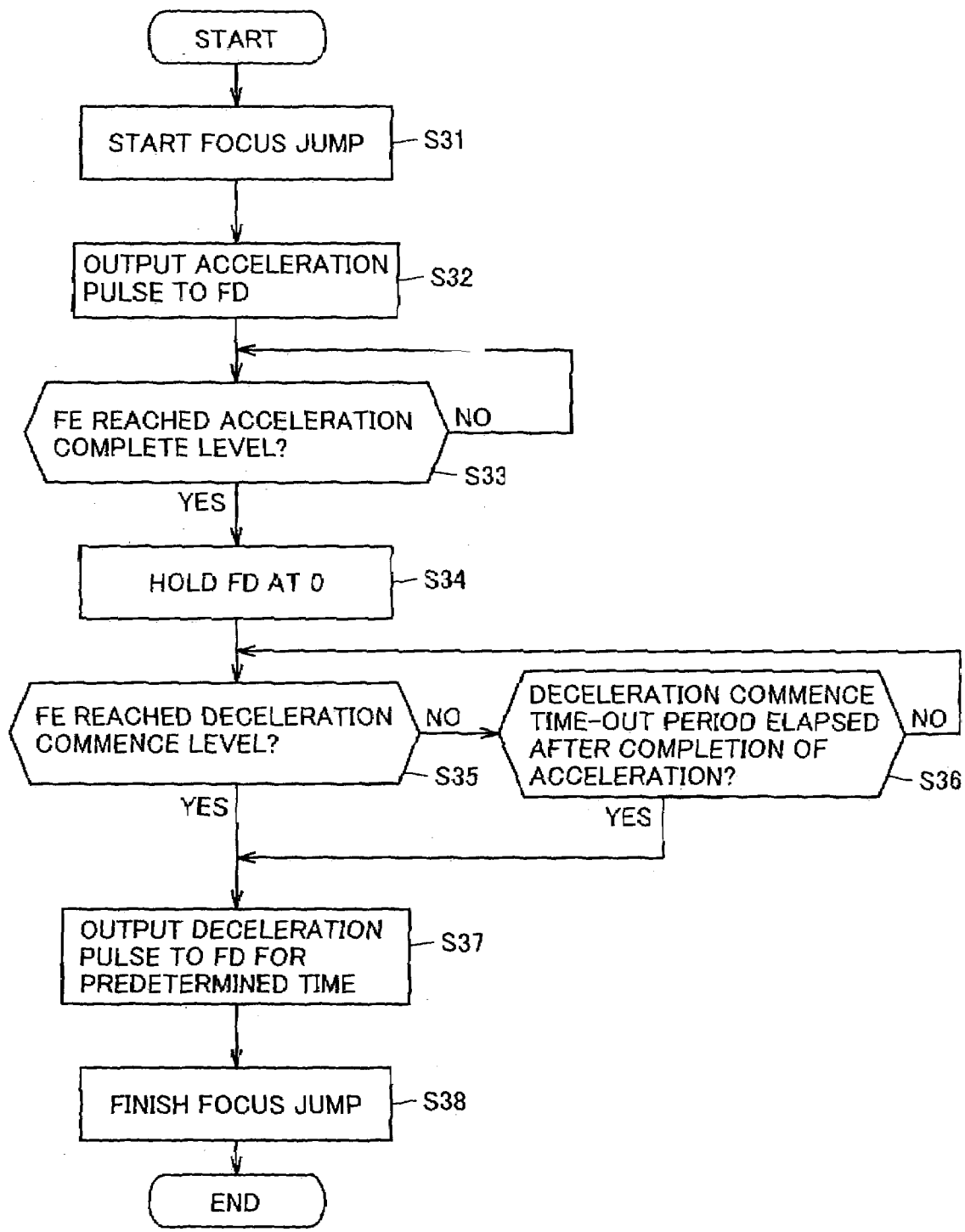
FIG. 8 is a flowchart showing a control procedure of a conventional focus jump operation.
Figure 9:
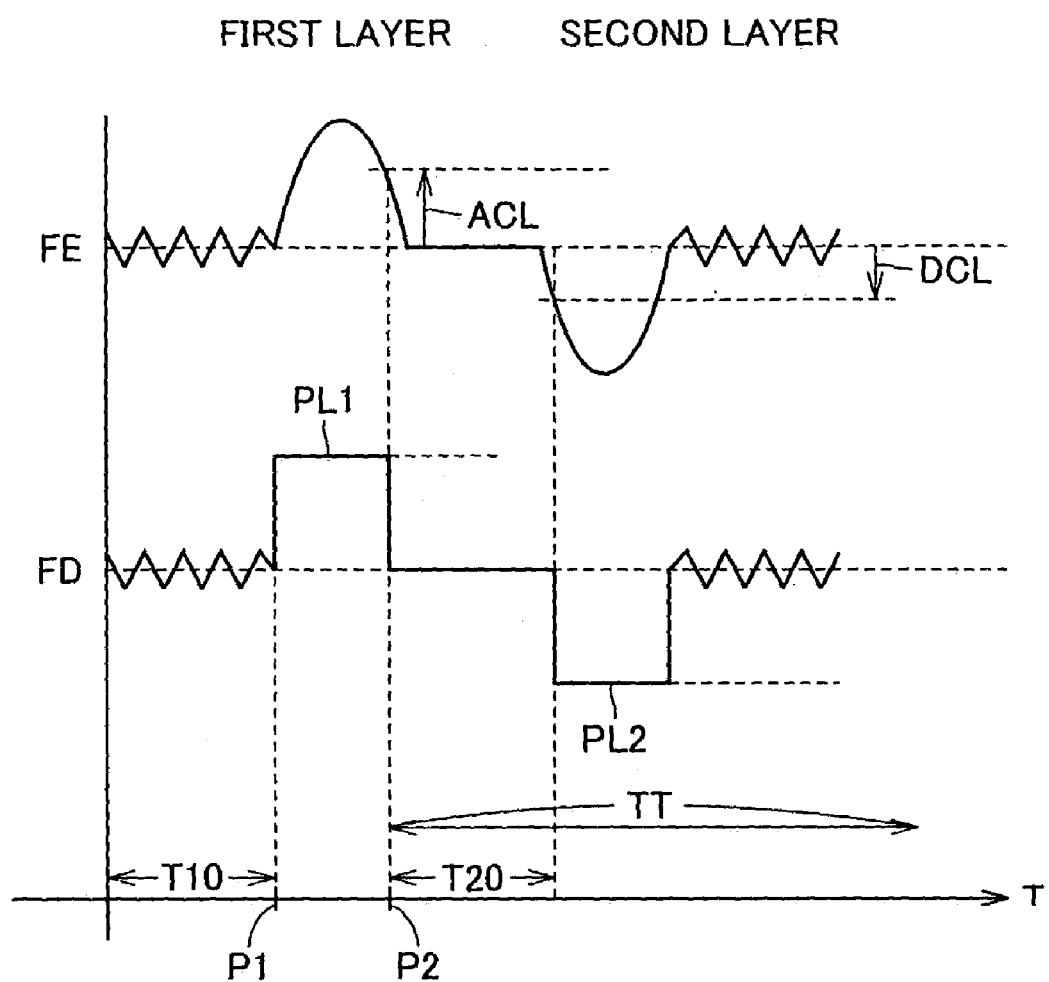
FIG. 9 is a diagram showing an example of the waveforms of a focus error signal and a focus drive signal detected in the focus jump operation of FIG. 8 with lapse of time.

The case of making a focus jump from recording layer 104 (first layer) to recording layer 102 (second layer) will be described by referring to waveforms of focus error signal FE and focus drive signal FD in FIG. 5 in accordance with a flowchart of FIG. 4 showing a procedure of the focus jump operation according to the embodiment.

First, based on reproduced data read by scanning, system controller 30 designates the second layer as a destination of the jump (recording layer 102) and instructs servo processor 31 to make a focus jump (S1), CPU 41 determines whether the focus jump of last time to recording layer 102 has finished within deceleration commence time-out period TT or not on the basis of flag FL2 corresponding to recording layer information RLI instructing recording layer 102 as a jump destination layer from table TB2 (S2). If the focus jump of last time was made within the period (FL2="0"), the program moves to step S4 to be described later, which is performed according to predetermined deceleration commence level DCL.

Figure 10:
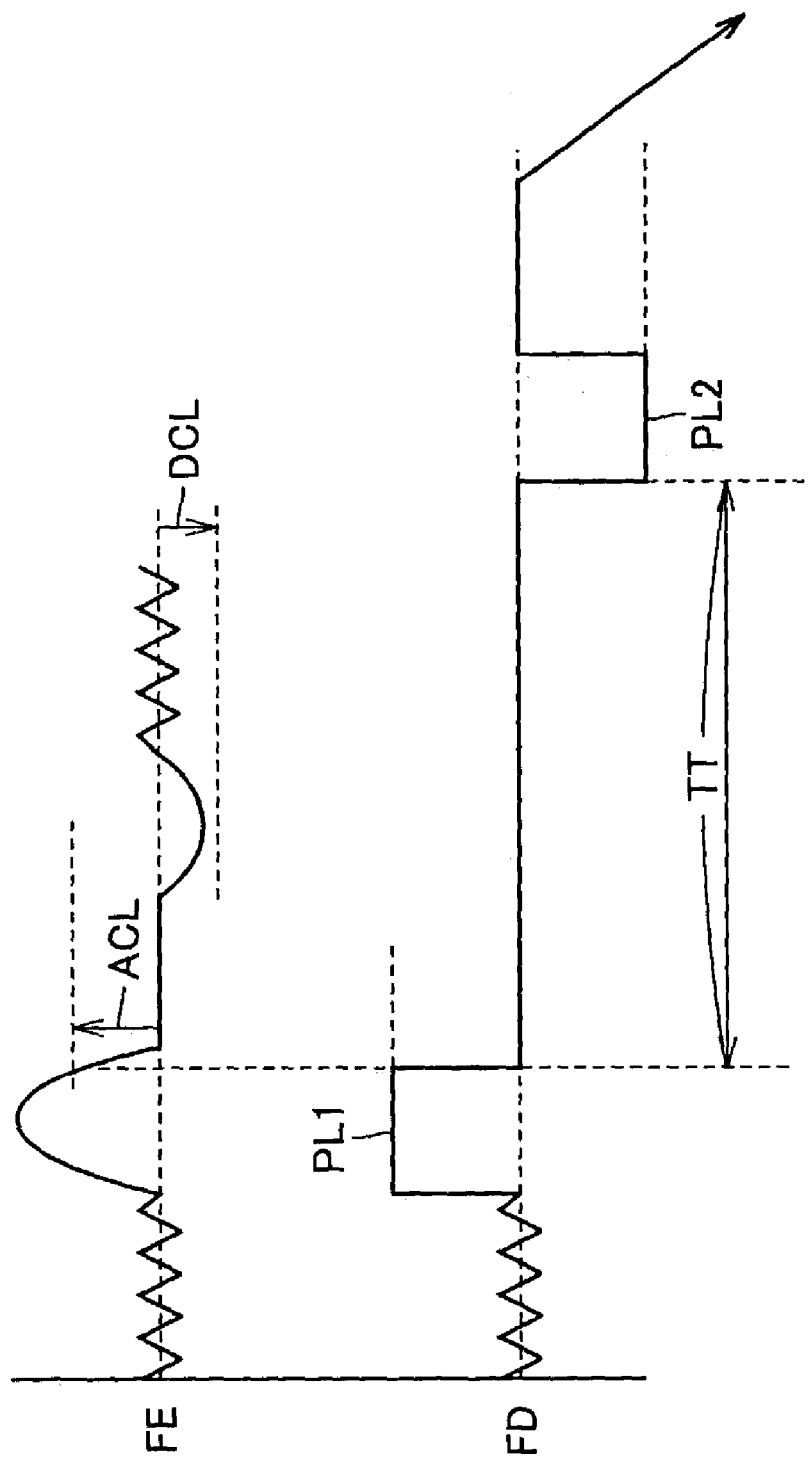
FIG. 10 is a diagram showing another example of the waveforms of the focus error signal and the focus drive signal detected in the focus jump operation of FIG. 8 with lapse of time.

It is assumed here that the focus jump of last time to recording layer 102 finished after deceleration commence time-out period TT as shown in FIG. 10. "1" has been therefore set in flag FL2 corresponding to recording layer information RLI of recording layer 102 in table TB2. Since "1" is set in corresponding flag FL2, a process is performed so that a focus jump of this time is finished within deceleration commence time-out period TT. Concretely, CPU 41 reads out specification level LV corresponding to flag FL1 (="1") indicative of the focus jump from recording layer 104 to recording layer 102 from table TB1 and sets specification level LV as deceleration commence level DCL, thereby changing deceleration commence level DCL (S3).

Subsequently, servo processor 31 applies an acceleration pulse PL1 in FIG. 5 as a focus jump braking signal to focus drive signal FD, so that the servo system starts moving optical pickup 1 (S4). When acceleration pulse PL1 is applied, counting of deceleration commence time-out period TT is started by timer 43.

When focus error signal FE is detected in parallel with movement of optical pickup 1 performed by application of acceleration pulse PL1 and focus error signal FE reaches predetermined acceleration complete level ACL (YES in S5), focus drive signal FD is held at the "0" level (S6). When focus error signal FE reaches preset deceleration commence level DCL within deceleration commence time-out period TT counted by timer 43 (YES in S7), deceleration pulse PL2 in FIG. 5 as a focus jump braking signal is applied to focus drive signal FD only for predetermined time (S10). The focus servo system performs a decelerating operation, movement of a laser beam emitted form optical pickup 1 to recording layer 102 as a jump destination is completed, and the laser beam comes into a focus state, and the focus jump is finished (S11).

On the other hand, if focus error signal FE does not reach deceleration commence level DCL within deceleration commence time-out period TT counted by timer 43 (NO in S7 and YES in S8), "1" is set in flag FL2 corresponding to recording layer information RLI instructing recording layer 102 as a jump destination of table TB2, and specified level LV corresponding to flag FL1 instructing a focus jump from recording layer 104 to recording layer 102 in table TB1 is set (S9). After that, the process in S10 and subsequent process are performed in a manner similar to the above.

In the process of step S9, on the basis of the maximum level of focus error signal FE detected within deceleration commence time-out period TT with respect to the recording layer as a jump destination of this time, specification level LV is set so as not to exceed the maximum level. The present invention is not limited to the level setting method. For example, specification level LV may be set to a level at which completion of the focus jump of this time within deceleration commence time-out period TT is guaranteed even if a preceding focus jump could not be completed within deceleration commence time-out period TT. Such a level is obtained by an experiment and fixedly written in table TB1.

As described above, in the case where deceleration pulse PL2 is applied even after deceleration commence time-out period TT in the focus jump so far, in other words, in the case where the level of focus error signal FE regarding a recording layer as the destination of a jump is too low and cannot reach deceleration commence level DCL, deceleration commence level DCL is changed so as to be lowered in the process of S3. As a result, the level of focus error signal FE reaches deceleration commence level DCL within deceleration commence time-out period TT in the focus jump and it is guaranteed that the timing of applying deceleration pulse PL2 is provided within deceleration commence time-out period TT. Consequently, on completion of movement of a laser beam to a recording layer as a jump destination, deceleration pulse PL2 is outputted and a focus jump can be made normally.

Therefore, by variably setting deceleration commence level DCL in accordance with the level of focus error signal FE of a recording layer as a jump destination, irrespective of the level of focus error signal FE regarding the recording layer as a jump destination, in other words, irrespective of variations in transmittance of light according to materials of various layers constructing DVD 100, the timing of applying deceleration pulse PL2 to focus drive signal FD can be provided stably in a state where a laser beam scans the recording layer as a jump destination, and a normal focus jump can be achieved.

It is sufficient to preliminarily obtain, by experiments or the like, initial acceleration commence level ACL, deceleration commence level DCL, acceleration pulse PL1, deceleration pulse PL2, and an application period (pulse width) of each of the pulses.

Although only deceleration commence level DCL is made variable by using specification level LV, similarly, acceleration completion level ACL may be variably set in accordance with the level of focus error signal FE, that is, variations in intervals of a plurality of recording layers or variations in transmittance of light according to materials of layers constructing DVD 100. A timing of applying acceleration pulse PL1 may be also variably set.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A focus control apparatus for controlling focus of a laser beam emitted to reproduce information onto an optical disk in which a plurality of recording layers are formed, on the basis of a focus error signal indicative of a deviation amount of the laser beam from a focus state in any of the recording layers, comprising:
   a light emitting device provided to emit the laser beam;
   a driver configured to drive the light emitting device in accordance with a drive signal;
   a servo controller configured to apply the drive signal having an acceleration pulse or a deceleration pulse to the driver to make a focus jump from a first recording layer to a second recording layer;
   a processor configured to determine whether a level of the focus error signal for the second recording layer reaches a predetermined value for the second recording layer and to lower the predetermined value in the case where the level of the focus error signal does not reach the predetermined value,
   wherein the servo controller applies the drive signal as a deceleration pulse to the driver in the case where the processor determines that the level of the focus error signal reaches the predetermined value.

2. The focus control apparatus according to claim 1,
   wherein the acceleration pulse is applied for starting a focus jump and the deceleration pulse is applied for starting deceleration,
   wherein the deceleration pulse is applied within a specific time-out period after application of the acceleration pulse, and
   wherein the processor determines whether the level of the focus error signal reaches the predetermined value within the specific time-out period or not.

3. The focus control apparatus according to claim 2, wherein the specific time-out period is set on the basis of a period in which the second recording layer as a destination of the focus jump can be irradiated with the laser beam.

4. An optical disk drive comprising:
   a focus controller for controlling focus of a laser beam emitted to reproduce information onto an optical disk in which a plurality of recording layers are formed, on the basis of a focus error signal indicative of a deviation amount of the laser beam from a focus state in any of the recording layers; and
   a light emitting device for irradiating the optical disk with the laser beam,
   wherein the focus controller includes:
   a driver configured to drive the light emitting device in accordance with a drive signal;
   a servo controller configured to apply the drive signal having an acceleration pulse or a deceleration pulse to the driver to make a focus jump from a first recording layer to a second recording layer;
   a processor configured to determine whether a level of the focus error signal for the second recording layer reaches a predetermined value and to lower the predetermined value in the case where the level of the focus error signal does not reach the predetermined value,
   wherein the servo controller applies the drive signal as a deceleration pulse to the driver in the case where the processor determines that the level of the focus error signal reaches the predetermined value.

5. A focus control method for controlling focus of a laser beam emitted to reproduce information onto an optical disk in which a plurality of recording layers are formed, on the basis of a focus error signal indicative of a deviation amount of the laser beam from a focus state in any of the recording layers, comprising:
   an accelerating signal applying step of, applying an acceleration pulse to a light emitting device configured to emit the laser beam so as to start a focus jump of the light emitting device from a first recording layer toward a second recording layer;

a level determining step of determining whether a level of the focus error signal for the second recording layer reaches a predetermined value or not;

a decelerating signal applying step of applying a deceleration pulse to the light emitting device in the case where it is determined in the level determining step that the level of the focus error signal reaches the predetermined value; and a level varying step of lowering the predetermined value in the case where it is determined in the level determining step that the level of the focus error signal does not reach the predetermined value.

6. The focus control method according to claim 5, wherein the deceleration pulse is applied for a specific time-out period after application of the acceleration pulse, and wherein the level determining step determines whether the level of the focus error signal reaches the predetermined value within the specific time-out period or not.

7. The focus control method according to claim 6, wherein the specific time-out period is set on the basis of a period in which the second recording layer as a destination of the jump can be irradiated with the laser beam.

* * * * *

UNITED STATES PATENT AND TRADEMARK OFFICE
CERTIFICATE OF CORRECTION

PATENT NO.        : 7,295,501 B2
APPLICATION NO.   : 10/625005
DATED             : November 13, 2007
INVENTOR(S)       : Ono It is certified that error appears in the above-identified patent and that said Letters Patent is hereby corrected as shown below:

On the Title page, Item

[*] Notice:     Subject to any disclaimer, the term of this patent is extended or adjusted under 35 USC 154(b) by 599 days Delete the phrase "by 599 days" and insert -- by 666 days --

Signed and Sealed this

Fourth Day of November, 2008

JON W. DUDAS
*Director of the United States Patent and Trademark Office*